(12) United States Patent
Xie

(10) Patent No.: US 11,989,391 B2
(45) Date of Patent: May 21, 2024

(54) INTERFACE DISPLAY METHOD AND ELECTRONIC DEVICE

(71) Applicant: VIVO MOBILE COMMUNICATION CO., LTD., Dongguan (CN)

(72) Inventor: Huabo Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/835,882

(22) Filed: Jun. 8, 2022

(65) Prior Publication Data

US 2022/0397992 A1 Dec. 15, 2022

Related U.S. Application Data

(63) Continuation of application No. PCT/CN2020/135122, filed on Dec. 10, 2020.

(30) Foreign Application Priority Data

Dec. 10, 2019 (CN) .......................... 201911260874.X

(51) Int. Cl.
*G06F 3/048* (2013.01)
*G06F 3/0482* (2013.01)
(Continued)

(52) U.S. Cl.
CPC .......... *G06F 3/0482* (2013.01); *H04L 51/216* (2022.05); *H04L 61/4594* (2022.05)

(58) Field of Classification Search
CPC .. G06F 3/0482; H04L 51/216; H04L 61/4594
See application file for complete search history.

(56) References Cited

U.S. PATENT DOCUMENTS 6,772,195 B1 * 8/2004 Hatlelid .............. G06F 3/04815
709/224
10,680,986 B1 * 6/2020 Wu ........................ H04L 51/043
(Continued)

FOREIGN PATENT DOCUMENTS

CN 105207896 A 12/2015
CN 105657326 A 6/2016
(Continued)

OTHER PUBLICATIONS

Extended European Search Report issued in related European Application No. 20898307.2, dated Dec. 2, 2022, 14 pages.
(Continued)

*Primary Examiner* — Claudia Dragoescu
(74) *Attorney, Agent, or Firm* — IPX PLLC

(57) ABSTRACT

An interface display method and an electronic device are provided. The method includes receiving a first input by a user in a case that a first interface of a first application is displayed, displaying a second interface including a target list in response to the first input, receiving a second input by the user for N members in the target list, and displaying a third interface in response to the second input. The target list of the second interface includes at least one of the following: a member list of at least one group in the first application or a contact list in at least one address book in the first application. In a case that the target list is a member list of the first group, the third interface is a group chat interface.

20 Claims, 5 Drawing Sheets

(51) Int. Cl.
*H04L 51/216* (2022.01)
*H04L 61/4594* (2022.01)

(56) References Cited

U.S. PATENT DOCUMENTS

| | | | |
|---|---|---|---|
| 2010/0251138 A1 | 9/2010 | Hardy et al. | |
| 2011/0289574 A1* | 11/2011 | Hull | G06Q 30/0601 |
| | | | 726/7 |
| 2014/0156757 A1* | 6/2014 | Zhang | H04L 12/1822 |
| | | | 709/204 |
| 2014/0359487 A1* | 12/2014 | Lee | G06Q 10/101 |
| | | | 715/758 |
| 2015/0296340 A1* | 10/2015 | Crutchfield | H04N 23/62 |
| | | | 455/456.1 |
| 2016/0065897 A1 | 3/2016 | Gottlieb | |
| 2016/0269338 A1* | 9/2016 | Ramaswamy | H04L 51/42 |
| 2018/0046726 A1* | 2/2018 | Zhang | G06F 16/9577 |
| 2018/0139252 A1* | 5/2018 | Wang | H04L 65/403 |
| 2018/0337963 A1* | 11/2018 | Faulkner | H04L 65/403 |
| 2019/0272095 A1 | 9/2019 | Leem et al. | |
| 2020/0067895 A1* | 2/2020 | Adami | H04L 63/0442 |

FOREIGN PATENT DOCUMENTS

| | | |
|---|---|---|
| CN | 105812429 A | 7/2016 |
| CN | 106034170 A | 10/2016 |
| CN | 106657613 A | 5/2017 |
| CN | 107733663 A | 2/2018 |
| CN | 108881783 A | 11/2018 |
| CN | 109428737 A | 3/2019 |
| CN | 111147661 A | 5/2020 |

OTHER PUBLICATIONS

International Search Report issued in corresponding International Application No. PCT/CN2020/135122, dated Mar. 3, 2021, 4 pages.
First Office Action issued in related Chinese Application No. 201911260874.X, dated Dec. 23, 2020, 8 pages.

* cited by examiner

INTERFACE DISPLAY METHOD AND ELECTRONIC DEVICE

CROSS-REFERENCE TO RELATED APPLICATIONS

This application is a continuation of International Application No. PCT/CN2020/135122, filed Dec. 10, 2020, which claims priority to Chinese Patent Application No. 201911260874.X, filed Dec. 10, 2019. The entire contents of each of the above-referenced applications are expressly incorporated herein by reference.

TECHNICAL FIELD

Embodiments of the present disclosure relate to the field of communication technologies, and in particular, to an interface display method and an electronic device.

BACKGROUND

With the fast development of terminal technologies and mobile Internet, there are increasingly more types of instant social applications. A user may communicate with other users anytime and anywhere about what they see and what they feel by using group chat functions of the social applications.

Currently, for some chat groups with relatively frequent communication and a relatively large quantity of members, when the user needs to send a message to some members (referred to as a plurality of target members below) in the chat group, the message may be drowned out by a large quantity of useless messages, and some target members in the plurality of target members fail to view the message in time. As a result, the user cannot notify the target members of the message in time. In the prior art, a solution to the problem is that the user separately sends the message to each target member in the plurality of target members or the user newly establishes a chat group for sending the message for the plurality of target members.

However, in a case that a member 1 in the plurality of target members is not a friend of the user, the user needs to add the member 1 as a friend before the user can separately send the message to the member 1 or add the member 1 to a new chat group. Therefore, an operation process of any solution is relatively complex and time-consuming.

SUMMARY

Embodiments of the present disclosure provide an interface display method and an electronic device.

According to a first aspect, an embodiment of the present disclosure provides an interface display method, applicable to an electronic device, the method including: receiving a first input by a user in a case that a first interface of a first application is displayed, the first interface being an interface corresponding to a first group; displaying a second interface in response to the first input, the second interface including a target list, the target list including at least one of the following: a member list of at least one group in the first application or a contact list in at least one address book in the first application; receiving a second input by the user for N members in the target list, N being an integer greater than 1; and displaying a third interface in response to the second input, the third interface being an interface corresponding to a shared group, the shared group including at least two members of the N members, where in a case that the target list is a member list of the first group, the third interface is a group chat interface.

According to a second aspect, an embodiment of the present disclosure provides an electronic device, including a receiving module and a display module, where the receiving module is configured to receive a first input by a user in a case that a first interface of a first application is displayed, the first interface being an interface corresponding to a first group; the display module is configured to display a second interface in response to the first input received by the receiving module, the second interface including a target list, the target list including at least one of the following: a member list of at least one group in the first application or a contact list in at least one address book in the first application; the receiving module is further configured to receive a second input by the user for N members in the target list, N being an integer greater than 1; and the display module is further configured to display a third interface in response to the second input received by the receiving module, the third interface being an interface corresponding to a shared group, the shared group including at least two members of the N members, where in a case that the target list is a member list of the first group, the third interface is a group chat interface.

According to a third aspect, an embodiment of the present disclosure provides an electronic device, including a processor, a memory, and a computer program stored on the memory and runnable on the processor, where the computer program, when executed by the processor, implements the steps of the interface display method according to the first aspect.

According to a fourth aspect, an embodiment of the present disclosure provides a computer-readable storage medium, storing a computer program, where the computer program, when executed by a processor, implements the steps of the interface display method according to the first aspect.

In this embodiment of the present disclosure, a first input by a user is received in a case that a first interface of a first application is displayed, the first interface being an interface corresponding to a first group; a second interface is displayed in response to the first input, the second interface including a target list, the target list including at least one of the following: a member list of at least one group in the first application or a contact list in at least one address book in the first application; a second input by the user for N members in the target list is received, N being an integer greater than 1; and a third interface is displayed in response to the second input, the third interface being an interface corresponding to a shared group, the shared group including at least two members of the N members, where in a case that the target list is a member list of the first group, the third interface is a group chat interface. By using this solution, in a case that a first interface of a first group is displayed, a user may rapidly establish a shared group between the user and at least two members in a target list by using a first input and a second input. In this way, in a case that the user needs to send a message to some members in a group (the user does not need to have a friend relationship with every member of the some members), the user may trigger an electronic device to rapidly establish the shared group between the user and the some members by using the first input and the second input, so that operations are simple and convenient, and time is saved for the user.

DETAILED DESCRIPTION

Figure 1:
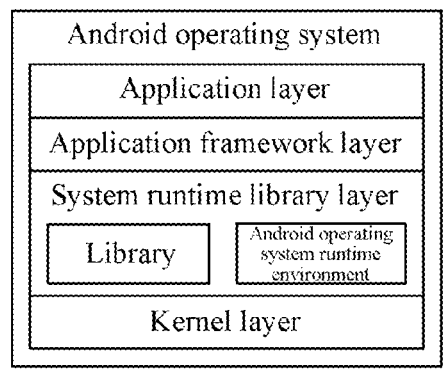
FIG. 1 is a schematic architectural diagram of a possible Android operating system according to an embodiment of the present disclosure.

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the transaction disclosure without creative efforts shall fall within the protection scope of the present disclosure.

The term "and/or" in this specification is an association relationship for describing associated objects, and represents that three relationships may exist, for example, A and/or B may represent the following three cases: A exists separately, both A and B exist, and B exists separately. The character "/" in this specification represents that associated objects are in an "or" relationship. For example, A/B represent A or B.

Terminologies such as "first", "second", "third", and "fourth" in this specification and claims of the present disclosure are used to distinguish different objects and are not used to describe a particular order of the objects. For example, a first input, a second input, a third input, a fourth input, and the like are used to distinguish different inputs and are not used to describe a particular order of the inputs.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the term "exemplary" or "for example" is intended to present a concept in a specific manner.

In descriptions of embodiments of the present disclosure, unless otherwise stated, "a plurality of" means two or more. For example, a plurality of processing units mean two or more processing units and a plurality of elements mean two or more elements.

An embodiment of the present disclosure provides an interface display method, including: receiving a first input by a user in a case that a first interface of a first application is displayed, the first interface being an interface corresponding to a first group; displaying a second interface in response to the first input, the second interface including a target list, the target list including at least one of the following: a member list of at least one group in the first application or a contact list in at least one address book in the first application; receiving a second input by the user for N members in the target list, N being an integer greater than 1; and displaying a third interface in response to the second input, the third interface being an interface corresponding to a shared group, the shared group including at least two members of the N members, where in a case that the target list is a member list of the first group, the third interface is a group chat interface. By using this solution, in a case that a first interface of a first group is displayed, a user may rapidly establish a shared group between the user and at least two members in a target list by using a first input and a second input. In this way, in a case that the user needs to send a message to some members in a group (the user does not need to have a friend relationship with every member of the some members), the user may trigger an electronic device to rapidly establish the shared group between the user and the some members by using the first input and the second input, so that operations are simple and convenient, and time is saved for the user.

The following describes a software environment to which an interface display method provided in the embodiments of the present disclosure is applicable by using an Android operating system as an example.

FIG. 1 is a schematic architectural diagram of a possible Android operating system according to an embodiment of the present disclosure. In FIG. 1, the architecture of the Android operating system includes four layers, which are respectively an application layer, an application framework layer, a system runtime library layer, and a kernel layer (which may be specifically a Linux kernel layer).

The application layer includes applications (including system applications and third-party applications) in the Android operating system.

The application framework layer is a framework of an application. A developer may develop some applications based on the application framework layer in a case of following a development principle of the framework of the application.

The system runtime library layer includes a library (or referred to as a system library) and an Android operating system runtime environment. The library mainly provides various resources required by the Android operating system. The Android operating system runtime environment is configured to provide a software environment for the Android operating system.

The kernel layer is an operating system layer of the Android operating system and is the lowest layer of software layers of the Android operating system. The kernel layer provides a core system service and a hardware-related driver for the Android operating system.

The Android operating system is used as an example. In this embodiment of the present disclosure, the developer may develop a software program that implements an interface display method provided in this embodiment of the present disclosure based on the system architecture of the Android operating system shown in FIG. 1, so that the interface display method may be performed based on the Android operating system shown in FIG. 1. That is, a processor or an electronic device may run the software program in the Android operating system to implement the interface display method provided in this embodiment of the present disclosure.

The electronic device in this embodiment of the present disclosure may be a mobile electronic device or may be a non-mobile electronic device. The mobile electronic device may be a mobile phone, a tablet computer, a notebook computer, a palmtop computer, an in-vehicle terminal, a wearable device, an ultra-mobile personal computer (UMPC), a netbook or a personal digital assistant (PDA), or the like. The non-mobile electronic device may be a personal computer (PC), a television (TV), an automated teller machine, a self-service machine, or the like. This is not specifically limited in this embodiment of the present disclosure.

An execution body of the interface display method provided in this embodiment of the present disclosure may be the electronic device (including the mobile electronic device and the non-mobile electronic device) or may be a functional module and/or functional entity that can implement the method in the electronic device. Specifically, the execution body may be determined based on an actual use requirement. This is not limited in this embodiment of the present disclosure. The interface display method provided in this embodiment of the present disclosure is exemplarily described below by using the electronic device as an example.

Figure 2:
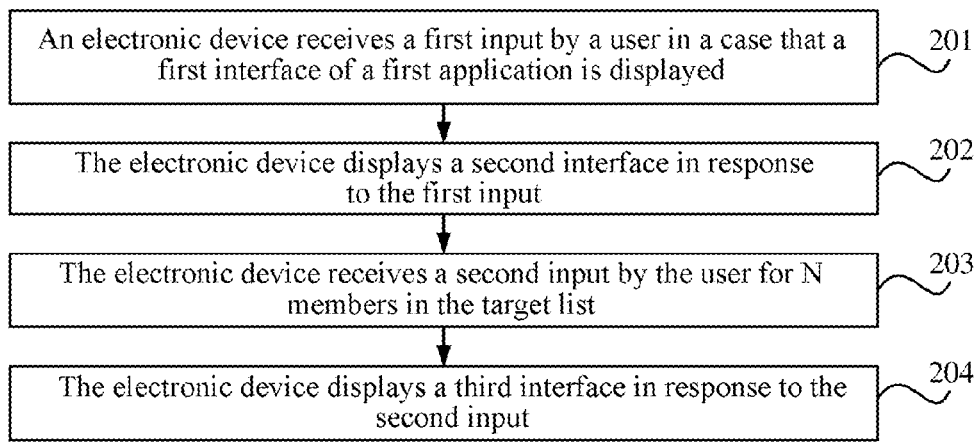
FIG. 2 is a flowchart 1 of an interface display method according to an embodiment of the present disclosure.

Referring to FIG. 2, an embodiment of the present disclosure provides an interface display method, applicable to an electronic device. The method may include the following step 201 to step 204.

Step 201. An electronic device receives a first input by a user in a case that a first interface of a first application is displayed.

The first interface is an interface corresponding to a first group.

It may be understood that in this embodiment of the present disclosure, the first application is an instant social application such as WeChat or QQ having a group chat function.

It may be understood that in this embodiment of the present disclosure, a group is a social group having three or more members. The first interface may be a chat window interface of the first group in the first application or may be a chat setting interface of the first group in the first application. This is not limited in this embodiment of the present disclosure.

For example, the first input may be a click/tap input by the user on the first interface (a target control, a target option, or the like in the first interface), a swipe input by the user on the first interface (a target control, a target option, or the like in the first interface), or another feasible input. This is not limited in this embodiment of the present disclosure.

For example, the click/tap input may be a click/tap input by any quantity of clicks, for example, a single-click/tap input, a double-click/tap input, or a triple-click/tap input. The swipe input may be a swipe input in any direction, for example, a swipe input in a counterclockwise direction, a swipe input in a clockwise direction, an upward swipe input, a downward swipe input, a leftward swipe input, or a rightward swipe input.

Step 202. The electronic device displays a second interface in response to the first input.

The second interface includes a target list, and the target list includes at least one of the following: a member list of at least one group in the first application or a contact list in at least one address book in the first application. The target list may include another list. This is not limited in this embodiment of the present disclosure.

For example, the target list includes, but is not limited to, the following three cases: In the first case, the target list includes the member list of the at least one group. In the second case, the target list includes the contact list in the at least one address book in the first application. In the third case, the target list includes the member list of the at least one group and the contact list in the at least one address book in the first application.

For example, the at least one group may include the first group or may not include the first group. This is not limited in this embodiment of the present disclosure.

For example, if the member list of the at least one group is a member list of one group, the member list of the at least one group may be a member list of the first group or may be a member list of a group (different from the first group) other than the first group.

For example, if the member list of the at least one group is member lists of at least two groups, the member list of the at least one group may be the member list of the first group and a member list of at least one group other than the first group, or the member list of the at least one group may be member lists of at least two groups other than the first group.

It should be noted that the displaying, by the electronic device, a second interface in response to the first input includes, but is not limited to, any one of the following cases: updating, by the electronic device, display from the first interface to the second interface in response to the first input; displaying, by the electronic device, the second interface on the first interface in a superimposed manner (including displaying the second interface in a floating manner) in response to the first input; and switching, by the electronic device, from the first interface to the second interface in response to the first input.

It may be understood that in this embodiment of the present disclosure, the electronic device displays the second interface including the target list, so that the user selects members from the target list to form a shared group.

Step 203. The electronic device receives a second input by the user for N members in the target list.

The second input is an input by the user for the N members in the target list, N being an integer greater than 1. It may be understood that the second input is used for triggering the electronic device to invite the N members in the target list to join the shared group.

For example, the second input may include a click/tap input, a swipe input, or the like of the user on each member option in N member options. This is not limited in this embodiment of the present disclosure.

For example, for detailed descriptions of the click/tap input and the swipe input, reference may be made to the related descriptions of the click/tap input and the swipe input in the description of the first input in step 201. Details are not described herein again.

Step 204. The electronic device displays a third interface in response to the second input.

The third interface is an interface corresponding to the shared group. The interface corresponding to the shared group may include a group chat interface and a group call interface. The shared group includes at least two members of the N members.

For example, in a case that the target list is the member list of the first group, the third interface is a group chat interface. It may be understood that in a case that the target list is the member list of the first group, the third interface is a group chat interface instead of the group call interface. In a case that the target list includes other lists than the member list of the first group, the third interface may be a group chat interface or the group call interface.

In this embodiment of the present disclosure, in a case that the target list includes at least one of a member list of at least one group in the first application or a contact list in at least one address book in the first application, the third interface is a group chat interface, that is, the third interface is a chat window interface of the shared group. A member in the shared group may send a text, a voice, an image, a file, and the like in the third interface. This is not limited in this embodiment of the present disclosure.

In this embodiment of the present disclosure, in a case that the target list includes a list other than the member list of the first group, the third interface is the group call interface. It may be understood that in this embodiment of the present disclosure, in a case that the target list includes at least one of a member list of a group than the member list of the first group or the contact list in the at least one address book (it should be noted that in this case, whether the target list includes the member list of the first group is not limited in this embodiment of the present disclosure), and the third interface may be the group call interface. In this embodiment of the present disclosure, the group call interface may be a group video call interface, a group voice call interface, or a group video and voice integrated interface (an interface with both a voice and a video).

It may be understood that in this embodiment of the present disclosure, the shared group further includes the user in addition to the at least two members.

For example, in this embodiment of the present disclosure, if it is set that an invited member (each member in the N members) needs to accept (agree to) an invitation before the member can join the shared group, the at least two members are members who accept the invitation among the N members. If it is set that an invited member can join the shared group without accepting an invitation, the at least two members are all the N members.

It may be understood that in this embodiment of the present disclosure, the electronic device sends an invitation message to an electronic device corresponding to each member in the N members in response to the second input by the user. In a case that a member needs to accept an invitation to join the shared group, if the electronic device receives acceptance messages fed back by electronic devices corresponding to at least two members, the electronic device displays the third interface. In a case that a member can join the shared group without accepting an invitation, the electronic device directly displays the third interface.

It should be noted that the displaying, by the electronic device, a third interface in response to the second input includes, but is not limited to, any one of the following cases: updating, by the electronic device, display from the second interface to the third interface in response to the second input; displaying, by the electronic device, the third interface on the second interface in a superimposed manner (including displaying the second interface in a floating manner) in response to the second input; and switching, by the electronic device, from the second interface to the third interface in response to the second input.

Figures 3A, 3B:
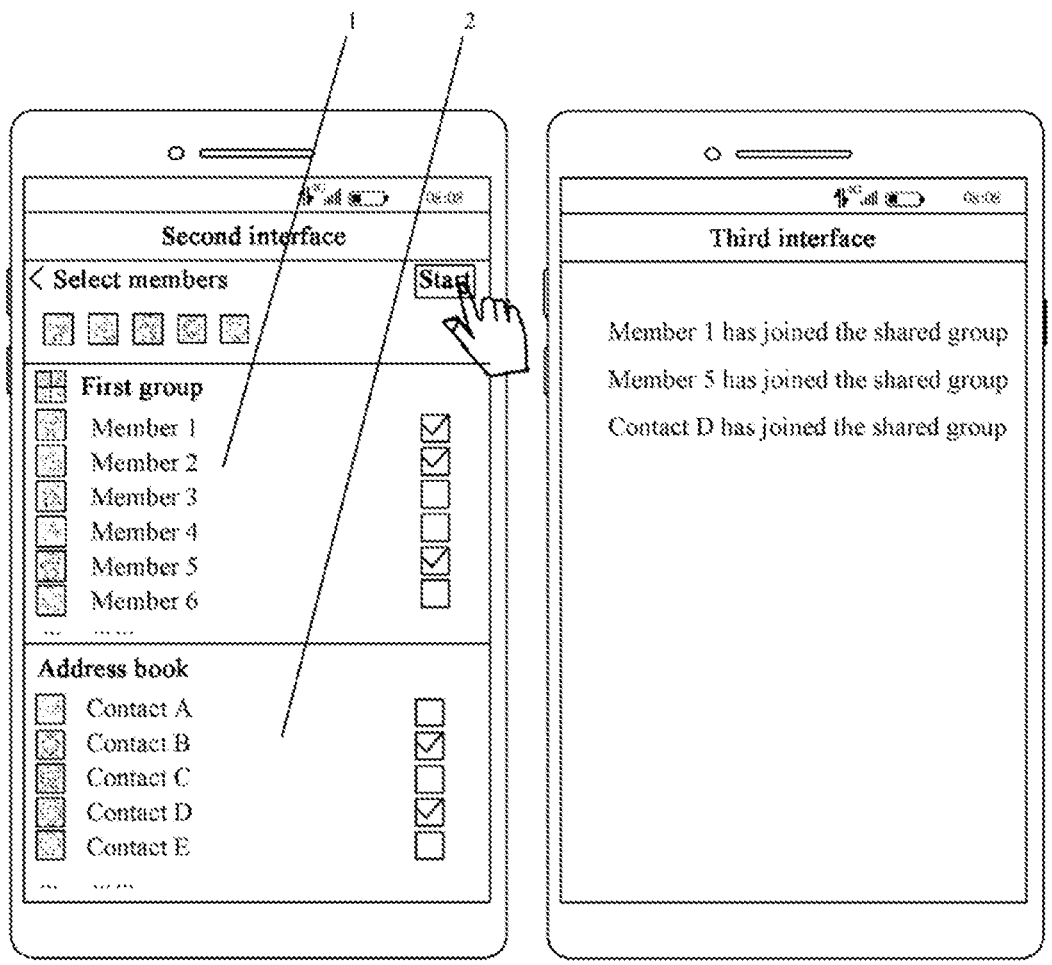
FIG. 3a and FIG. 3b are schematic diagrams of an interface of an interface display method according to an embodiment of the present disclosure.

For example, a member needs to accept an invitation to join the shared group, N is 5, and the third interface is a group chat interface. A second interface shown in FIG. 3a includes a member list of a first group indicated by a mark "1" and a contact list in an address book indicated by a mark "2". A user selects a "member 1" option, a "member 2" option, a "member 5" option, a "contact B" option, and a "contact D" option by using a second input and clicks/taps a "start" option. An electronic device sends an invitation message to each of an electronic device corresponding to the "member 1", an electronic device corresponding to the "member 2", an electronic device corresponding to the "member 5", an electronic device corresponding to the "contact B", and an electronic device corresponding to the "contact D" in response to the second input. In a case that the electronic device of a user corresponding to the "member 1", the electronic device corresponding to the "member 5", and the electronic device corresponding to the "contact D" have respectively fed back acceptance messages to the electronic device, the electronic device updates display from the second interface to a third interface shown in FIG. 3b.

An embodiment of the present disclosure provides an electronic device, configured to: receive a first input by a user in a case that a first interface of a first application is displayed, the first interface being an interface corresponding to a first group; display a second interface in response to the first input, the second interface including a target list, the target list including at least one of the following: a member list of at least one group in the first application or a contact list in at least one address book in the first application; receive a second input by the user for N members in the target list, N being an integer greater than 1; and display a third interface in response to the second input, the third interface being an interface corresponding to a shared group, the shared group including at least two members of the N members, where in a case that the target list is a member list of the first group, the third interface is a group chat interface. By using this solution, in a case that a first interface of a first group is displayed, a user may rapidly establish a shared group between the user and at least two members in a target list by using a first input and a second input. In this way, in a case that the user needs to send a message to some members in a group (the user does not need to have a friend relationship with every member of the some members), the user may trigger an electronic device to rapidly establish the shared group between the user and the some members by using the first input and the second input, so that operations are simple and convenient, and time is saved for the user.

It should be noted that an embodiment of the present disclosure provides a method for rapidly establishing a group on a group (that is, establishing a shared group based on an original group) in which members in a newly established group are not limited to members in an original group. Therefore, a problem that an operation process of an existing solution of sending a message to some members in a chat group is relatively complex and time-consuming can be resolved. In addition, a message may be simultaneously sent to a member other than the members in the original group, and the user does not need to be in a friend relationship with all members in the newly established group. In addition, the message is sent in the newly established group without disturbing other members in the original group with redundant messages (the other members in the original group do not receive the message), and it can be ensured that the message is not leaked in a case that the message is a message with high privacy and confidentiality.

It should be noted that in this embodiment of the present disclosure, the established shared group is actually a shared group chat mode established based on some members in the original group and members in a non-original group, and members in the mode may send a message, view a message, and the like. In the shared group chat mode, a sent message can be displayed to only the members in the shared group chat mode for viewing and cannot be displayed to members in a non-shared group chat mode for viewing. For example, in a shared group chat mode, if a member is a member in the shared group chat mode, the message is displayed on a third interface of an electronic device of the member, and if the member is a member in a non-shared group chat mode, the message is not displayed in the electronic device of the member. In this embodiment of the present disclosure, the shared group may actually exist as a group in the prior art, that is, an identifier (used for indicating the shared group) of the shared group is displayed in the first application, or may be a virtual group, and the identifier of the shared group is not displayed in the first application. This is not limited in this embodiment of the present disclosure.

For example, in this embodiment of the present disclosure, before the electronic device displays the target list, the electronic device may first display M group options and address book options for the user to select a target option corresponding to a required target list.

For example, step 202 may be specifically implemented by using the following step 202a to step 202c.

Step 202a. The electronic device displays a fourth interface in response to the first input.

The fourth interface includes M group options and address book options in the first application. Each group option is used for indicating a member list in one group, and the address book option is used for indicating the contact list in the address book, M being a positive integer.

It should be noted that the displaying, by the electronic device, a fourth interface in response to the first input includes, but is not limited to, any one of the following cases: updating, by the electronic device, display from the first interface to the fourth interface in response to the first input; displaying, by the electronic device, the fourth interface on the first interface in a superimposed manner (including displaying the second interface in a floating manner) in response to the first input; and switching, by the electronic device, from the first interface to the fourth interface in response to the first input.

Step 202b. The electronic device receives a third input by the user.

The third input is an input by the user for selecting a target option from the M group options and the address book options, and the target option is used for indicating the target list.

For example, the third input may be a click/tap input, a swipe input, or the like of the user for the target option. This is not limited in this embodiment of the present disclosure.

For example, for detailed descriptions of the click/tap input and the swipe input, reference may be made to the related descriptions of the click/tap input and the swipe input in the description of the first input in step 201. Details are not described herein again.

Step 202c. The electronic device displays the second interface in response to the third input.

It should be noted that the displaying, by the electronic device, the second interface in response to the third input includes, but is not limited to, any one of the following cases: updating, by the electronic device, display from the fourth interface to the second interface in response to the third input; displaying, by the electronic device, the second interface on the fourth interface in a superimposed manner (including displaying the second interface in a floating manner) in response to the third input; and switching, by the electronic device, the fourth interface to the second interface in response to the third input.

In this embodiment of the present disclosure, before displaying the second interface including the target list, the electronic device first displays the fourth interface including the M group options and the address book options, and after the user selects the target option used for indicating the target list from the M group options and the address book options by using the third input, the electronic device displays the second interface. Therefore, in this embodiment of the present disclosure, sources of the members in the shared group may be determined according to user requirements, which can also meet the user requirements, to improve the performance of human-computer interaction.

For example, in this embodiment of the present disclosure, before displaying the third interface, the electronic device may use prompt information to prompt the user with a quantity of members who have joined the shared group, and determine whether it is necessary to continue to establish the shared group according to the quantity of members.

For example, step 204 may be specifically implemented by using the following step 204a to step 204c.

Step 204a. The electronic device displays second prompt information in the second interface in a superimposed manner in response to the second input.

The second prompt information is used for prompting that a quantity of members who have joined the shared group is Q and whether to enter the interface corresponding to the shared group, Q being an integer greater than 2.

A display form of the second prompt information is not limited in this embodiment of the present disclosure. For example, the second prompt information is displayed in the second interface by using a pop-up window.

Actual content of the second prompt information is not limited in this embodiment of the present disclosure and may be specifically set according to an actual use requirement.

Step 204b. The electronic device receives a fourth input by the user for the second prompt information.

For example, the fourth input is an input by the user for selecting "Enter the interface corresponding to the shared group" on the second prompt information. The fourth input may be a click/tap input, a swipe input, or the like of the user on an option used for indicating "Enter the interface corresponding to the shared group". This is not limited in this embodiment of the present disclosure.

For example, for detailed descriptions of the click/tap input and the swipe input, reference may be made to the related descriptions of the click/tap input and the swipe input in the description of the first input in step 201. Details are not described herein again.

Step 204c. The electronic device displays the third interface in response to the fourth input.

In this embodiment of the present disclosure, before displaying the third interface, the electronic device may use the second prompt information to prompt the user with a quantity of members who have joined the shared group, for the user to determine, according to the quantity of members, whether it is necessary to continue to establish the shared group, and to prompt the user whether the user has missed a member who needs to be invited but is not invited. In addition, in a case that an invited member needs to accept an invitation to join the shared group, if there is a relatively small quantity of members accepting the invitation, the user may be prompted with a quantity of members who have accepted the invitation.

For example, in a case that an invited member needs to accept an invitation to join the shared group, after step 203, if an invited member has refused to accept the invitation due to a personal reason, the electronic device may use prompt information to prompt the user that the member has refused to join the shared group.

Figure 4:
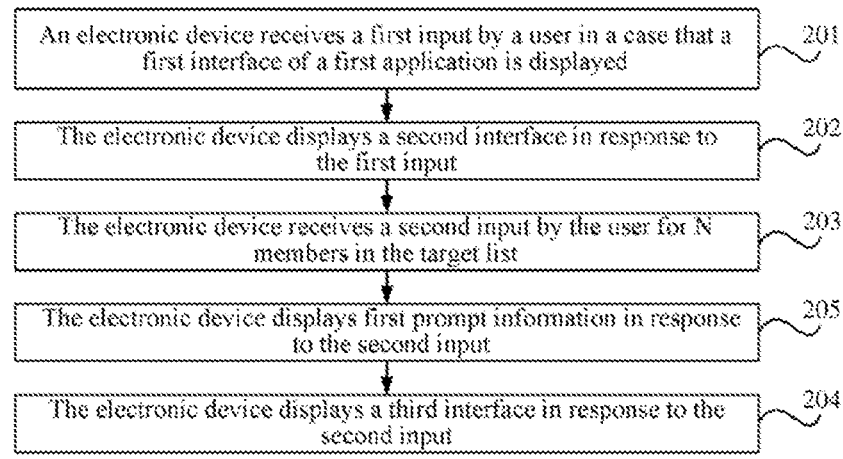
FIG. 4 is a flowchart 2 of an interface display method according to an embodiment of the present disclosure.

For example, with reference to FIG. 2, as shown in FIG. 4, after step 203, the interface display method provided in this embodiment of the present disclosure may further include the following step 205.

Step 205. The electronic device displays first prompt information in response to the second input.

The first prompt information is used for prompting that a first member in the N members has refused to join the shared group and whether to reinvite the first member to join the shared group.

For example, the first prompt information may be displayed in the second interface in a superimposed manner or the first prompt information may be displayed in the third interface in a superimposed manner.

A display form of the first prompt information is not limited in this embodiment of the present disclosure. For example, the first prompt information is displayed in the third interface by using a pop-up window.

Actual content of the first prompt information is not limited in this embodiment of the present disclosure and may be specifically set according to an actual use requirement.

In this embodiment of the present disclosure, the user may use an input for the first prompt information to determine whether to reinvite the first member to join the shared group. Details are not described herein.

In this embodiment of the present disclosure, the electronic device displays the first prompt information, so that the user may learn in time which member has refused to join the shared group (instead of using confirmation from a member that has not joined the shared group to learn which member has refused to join the shared group) and determine the importance of the member (for example, the member has relatively high relevance with a message that needs to be communicated in the shared group) and whether it is necessary to communicate with the member privately and then reinvite the member.

It should be noted that an order of performing step 204 and step 205 is not limited in this embodiment of the present disclosure. For example, step 204 may be first performed, and then step 205 is performed; or step 205 may be first performed, and then step 204 is performed; or step 204 and step 205 may be performed simultaneously.

For example, when detecting that a member has left the shared group or a new member has joined the shared group, the electronic device may prompt the user by using prompt information.

For example, after step 204, the interface display method provided in this embodiment of the present disclosure may further include the following step 206.

Step 206. The electronic device displays third prompt information in the third interface.

The third prompt information is used for prompting that a second member in the shared group has left the shared group; or the third prompt information is used for prompting that a first object has joined the shared group.

Actual content of the third prompt information is not limited in this embodiment of the present disclosure and may be specifically set according to an actual use requirement.

In this embodiment of the present disclosure, the third prompt information is used to prompt the user that a member has left the shared group or a new member has joined the shared group, so that the user may learn, according to the third prompt information, which member has left the shared group or which member has newly joined the shared group and may perform a next operation, for example, whether to reinvite the member who has left the shared group or whether to set a permission for the member who has newly joined the shared group.

For example, when detecting that a member other than the user in the shared group invites a new member to join the shared group, to protect privacy, information security, and the like, the electronic device may use prompt information to prompt the user whether to allow the new member to join the shared group.

For example, in a case that the third prompt information is used for prompting that the first object has joined the shared group, before step 206, the interface display method provided in this embodiment of the present disclosure may further include the following step 207 and step 208. Step 206 may be specifically implemented by using the following step 206a.

Step 207. The electronic device displays fourth prompt information in the third interface in a superimposed manner.

The fourth prompt information is used for prompting the user whether to allow the first object to join the shared group. The first object is an object invited by a member other than the user in the shared group to join the shared group.

It should be noted that in this embodiment of the present disclosure, the first object may be in a friend relationship with a member who invites the first object to join the shared group and whether to be in a friend relationship with other members in the shared group is not limited.

A display form of the fourth prompt information is not limited in this embodiment of the present disclosure. For example, the fourth prompt information is displayed in the third interface by using a pop-up window.

Actual content of the fourth prompt information is not limited in this embodiment of the present disclosure and may be specifically set according to an actual use requirement.

Step 208. The electronic device receives a fifth input by the user for the fourth prompt information.

For example, the fifth input is an input by the user for selecting "Allow the first object to join the shared group" on the fourth prompt information. The fifth input may be a click/tap input, a swipe input, or the like of the user on an option used for indicating "Allow the first object to join the shared group". This is not limited in this embodiment of the present disclosure.

It may be understood that if the user selects "Do not allow the first object to join the shared group", the first object cannot join the shared group.

For example, for detailed descriptions of the click/tap input and the swipe input, reference may be made to the related descriptions of the click/tap input and the swipe input in the description of the first input in step 201. Details are not described herein again.

Step 206a. The electronic device displays the third prompt information in the third interface in response to the fifth input.

In this embodiment of the present disclosure, the fourth prompt information is used to prompt the user that a member invites the first object to join the shared group and whether to allow the first object to join the shared group for the user to perform confirmation, so that the privacy and security of information in the shared group can be ensured.

For example, in a case that the third prompt information is used for prompting that the second member in the shared group has left the shared group, the electronic device may prompt the user, according to a relationship between a quantity of remaining members in the shared group and a preset threshold, whether to cancel the shared group.

For example, in a case that the third prompt information is used for prompting that the second member in the shared group has left the shared group, after step 206, the interface display method provided in this embodiment of the present disclosure may further include the following step 209.

Step 209. The electronic device displays fifth prompt information in the third interface in a superimposed manner in a case of detecting that a quantity of members in the shared group is less than or equal to a preset threshold.

The fifth prompt information is used for prompting whether to cancel the shared group. In this embodiment of the present disclosure, the canceling the shared group is dismissing the shared group, deleting the shared group, ending the shared group, or the like.

A display form of the fifth prompt information is not limited in this embodiment of the present disclosure. For example, the fifth prompt information is displayed in the third interface by using a pop-up window.

Actual content of the fifth prompt information is not limited in this embodiment of the present disclosure and may be specifically set according to an actual use requirement. The value of the preset threshold is not limited, and a specific value may be set according to an actual use requirement.

In this embodiment of the present disclosure, in a case that there is a relatively small quantity of members in the shared group, the electronic device uses the fifth prompt information to prompt the user whether it is necessary to continue with the shared group and whether shared chat needs to be ended. Therefore, unnecessary shared chat is avoided.

For example, the user may set a sharing permission for any member in the shared group by using an input.

Figure 5:
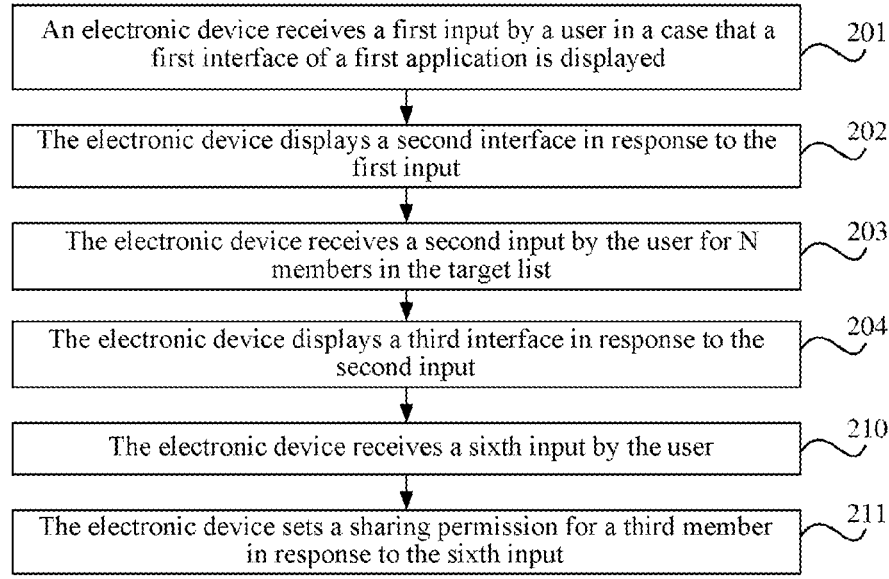
FIG. 5 is a flowchart 3 of an interface display method according to an embodiment of the present disclosure.

For example, with reference to FIG. 2, as shown in FIG. 5, after step 204, the interface display method provided in this embodiment of the present disclosure may further include the following step 210 and step 211.

Step 210. The electronic device receives a sixth input by the user.

Step 211. The electronic device sets a sharing permission for a third member in response to the sixth input.

The third member is a member other than the user in the shared group. The sharing permission includes at least one of the following: a permission to view information, a permission to send information, a permission to modify a permission of another member, a permission to invite a new member to join the shared group, a permission to download information, or a permission to take a screenshot of the third interface. The sharing permission may further include another permission. This is not limited in this embodiment of the present disclosure.

It may be understood that the permission to view information includes a permission to view information such as text information, picture information, video information, file information, voice information, and emoji information. The permission to send information includes a permission to send information such as text information, picture information, video information, file information, voice information, and emoji information. The permission to modify a permission of another member includes a permission to modify whether another member has a permission such as the permission to view information, the permission to send information, the permission to modify a permission of another member, the permission to invite a new member to join the shared group, the permission to download information, or the permission to take a screenshot of the third interface. The permission to invite a new member to join the shared group is a permission to invite an object other than the members in the shared group to join the shared group. The permission to download information is a permission to download information sent by the members in the shared group. The permission to take a screenshot of the third interface is a permission to perform screen capturing on the third interface.

It should be noted that in this embodiment of the present disclosure, the video information may include video information in a video call interface and video information in a group chat interface. A permission to view video information but not to send video information in a video call interface may be referred to as an observation permission.

In this embodiment of the present disclosure, as an initiator (commonly known as a group owner) of the shared group, the user may have all the sharing permissions. Other members may have one or more of all the sharing permissions under setting of the user. This is not limited in this embodiment of the present disclosure.

For example, a member in the shared group may send a private file or main content to the third interface. After members in the shared group have communicated for a period of time, the members in the shared group may invite, according to a requirement of chat content, another object (for example, the first object) to join the shared group. The user may set all the sharing permissions for a newly joined member, or the user may set only a permission to view a message for a newly joined member. For example, employees in a company are having a meeting through a shared group to discuss matters related to target business. A business party of the target business needs to attend the meeting. Therefore, a member related to the business party in the shared group may invite the business party to join the shared group. However, the business party is not allowed to view some private files and project content. Therefore, it may be set that the business party is not allowed to view these files and project content.

In this embodiment of the present disclosure, the setting the sharing permission for the third member may include setting the sharing permission for the third member when the third member has just joined the shared group, or may include that the user determines to modify the sharing permission for the third member according to an actual requirement after the third member has entered the shared group for a period of time.

For example, the sixth input is an input by the user for setting whether the sharing permission for the third member is "Allow" or "Forbid". The sixth input may be a click/tap input, a swipe input, or the like of the user on an "Allow" option or a "Forbid" option of the sharing permission. This is not limited in this embodiment of the present disclosure.

For example, for detailed descriptions of the click/tap input and the swipe input, reference may be made to the related descriptions of the click/tap input and the swipe input in step 201. Details are not described herein again.

For example, the sixth input may be an input by the user for inputting the sharing permission allowed for the third member or may be another feasible input. This is not limited in this embodiment of the present disclosure.

In this embodiment of the present disclosure, the user triggers the electronic device to set a permission for the third member by using the sixth input, to better ensure the privacy and security of the information in the shared group.

For example, after the third interface is displayed, in a case that the third member has joined the shared group, the sharing permission includes: a permission to view chat information before the third member has joined the shared group.

It may be understood that in a case that the third member has joined the shared group later, if the third member has a permission to view chat information before the third member has joined the shared group, other members do not need to send necessary information of previous chat information to the third member, so that an operation may be simplified, and other members can be prevented from disturbance with redundant information due to sending of repeated information.

It should be noted that an order of performing step 210 and step 211 and step 206 is not limited in this embodiment of the present disclosure. For example, step 210 and step 211 may be first performed and then step 206 is performed; or step 206 may be first performed and then step 210 and step 211 are performed; or step 210 and step 211 and step 206 may be performed simultaneously.

For example, in a case that the third interface is the group call interface, the user may control an output volume of an electronic device of another member by using an input.

Figure 6:
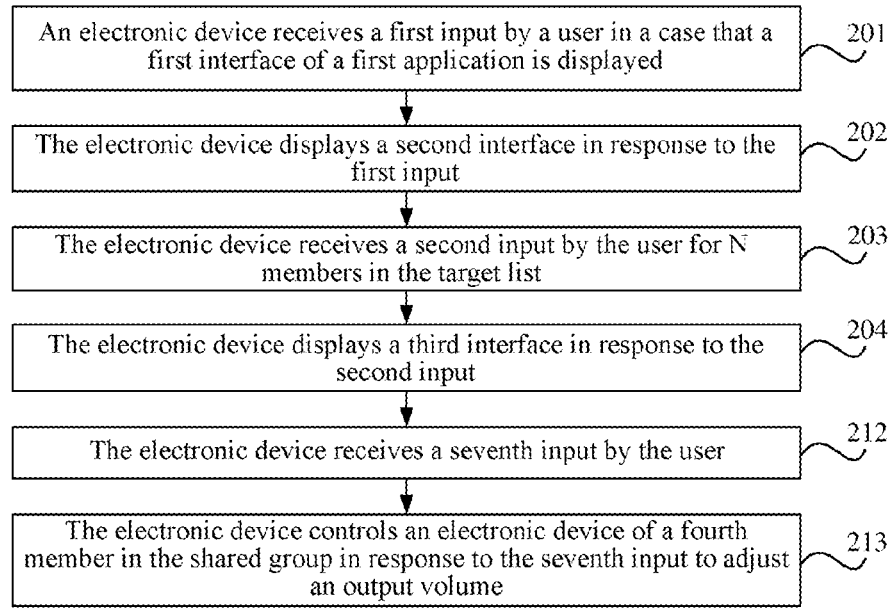
FIG. 6 is a flowchart 4 of an interface display method according to an embodiment of the present disclosure.

For example, in a case that the third interface is the group call interface, with reference to FIG. 2, as shown in FIG. 6, after step 204, the interface display method provided in this embodiment of the present disclosure may further include the following step 212 and step 213.

Step 212. The electronic device receives a seventh input by the user.

For example, the seventh input may be a click/tap input, a swipe input, or the like of the user on a volume adjustment control. This is not limited in this embodiment of the present disclosure.

For example, for detailed descriptions of the click/tap input and the swipe input, reference may be made to the related descriptions of the click/tap input and the swipe input in the description of the first input in step 201. Details are not described herein again.

Step 213. The electronic device controls an electronic device of a fourth member in the shared group in response to the seventh input to adjust an output volume.

In this embodiment of the present disclosure, for a manner in which the electronic device controls an electronic device of a fourth member in the shared group to adjust an output volume, reference may be made to any related art. This is not limited in this embodiment of the present disclosure.

For example, the electronic device obtains a control instruction corresponding to the seventh input, and then sends, according to the control instruction, a control message carrying the control instruction to the electronic device of the fourth member. The electronic device of the fourth member adjusts the output volume of the electronic device of the fourth member according to the control message received from the electronic device. When obtaining the control instruction corresponding to the seventh input, the electronic device may first send a request message to the electronic device of the fourth member to request the electronic device of the fourth member to feed back environment information of the electronic device of the fourth member, after receiving the environment information fed back by the electronic device of the fourth member from the electronic device of the fourth member, the electronic device feeds back the environment information to the user, and finally the user controls the electronic device of the fourth member in the shared group according to the environment information and by using the seventh input to adjust the output volume.

In this embodiment of the present disclosure, the user triggers the electronic device by using the seventh input to control the electronic device of the fourth member in the shared group to adjust the output volume, so that the output volume of the electronic device of the fourth member can be adjusted in time in a case that the fourth member cannot change the output volume of the electronic device of the fourth member (for example, an elderly does not know how to adjust the output volume or does not realize that the output volume needs to be adjusted).

For example, in a case that the third interface is the group call interface, a member in the shared group may set that the member only views video information of other members but does not show video information of the member to the other members within a period of time, for example, set a personal status to a voice mode or a mosaic privacy mode without affecting whether a current status of another member is a video mode, the voice mode, or the mosaic privacy mode. This protects personal privacy without affecting the needs of others. In addition, the member in the shared group may separately invite a personal friend to join the shared group for trial and observation. For example, during a video call with a child, it is found that a camera on the side of the child is very nice, other relatives of the child may be invited to join the shared group for observation, and the relatives may join the shared video or may only view the video without interrupting an existing chat mode. In addition, during the video call, it is found that some members (referred to as target members below) may not notice a volume, ambient noise, and the like, and then a member who invites other objects to join the shared group can set volumes of electronic devices of the invited members, to adapt to a volume, ambient noise, and the like of a target member.

For example, in a case that the shared group has been canceled, the user may view historical chat information of the shared group by using an input within a particular period of time.

Figure 7:
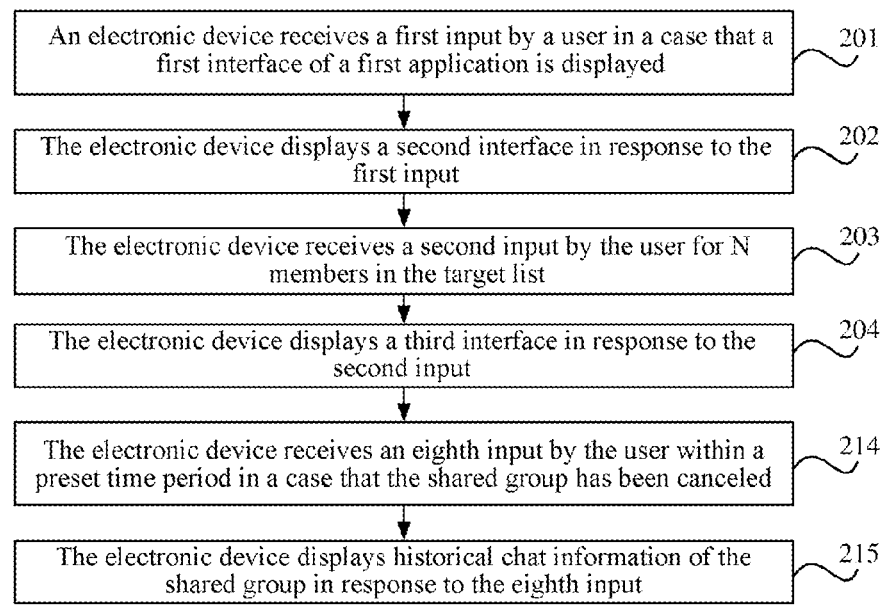
FIG. 7 is a flowchart 5 of an interface display method according to an embodiment of the present disclosure.

For example, in a case that the third interface is a group chat interface, with reference to FIG. 2, as shown in FIG. 7, after step 204, the interface display method provided in this embodiment of the present disclosure may further include the following step 214 and step 215.

Step 214. The electronic device receives an eighth input by the user within a preset time period in a case that the shared group has been canceled.

The duration of the preset time period is a preset duration, and the value of the preset duration may be set according to an actual use requirement. This is not limited in this embodiment of the present disclosure. A starting time of the preset time period is a moment at which the shared group is canceled.

Step 215. The electronic device displays historical chat information of the shared group in response to the eighth input.

For example, in this embodiment of the present disclosure, when the shared group is canceled, a control (or an option) associated with the shared group may be displayed in a preset area in the first application. Within a preset time period of timeliness of the control (or the option) (that is, within a preset duration from a moment at which the shared group is canceled), the user may trigger the electronic device by using the eighth input on the control (or the option) to display the historical chat information (or may be referred to as a historical chat record) of the shared group.

For example, the eighth input may be a click/tap input, a swipe input, or the like of the user on the control (or the option). This is not limited in this embodiment of the present disclosure.

For example, for detailed descriptions of the click/tap input and the swipe input, reference may be made to the related descriptions of the click/tap input and the swipe input in the description of the first input in step 201. Details are not described herein again.

In the existing related art, in a case that a group has been canceled, historical chat information of the group cannot be viewed. In this embodiment of the present disclosure, within the preset time period, the user may continue to view the historical chat information of the shared group by using an input, so that in a case that the user needs information of the historical chat information but has not recorded the information, the user may continue to view the information, to improve the performance of human-computer interaction.

The accompanying drawings in the embodiments of the present disclosure are all examples with reference to the drawings of independent embodiments. During specific implementation, the accompanying drawings may further be implemented in combination with any other accompanying drawings, which is not limited in the embodiments of the present disclosure. For example, with reference to FIG. 4, after step 204, the interface display method provided in this embodiment of the present disclosure may further include step 210 and step 211.

Figure 8:
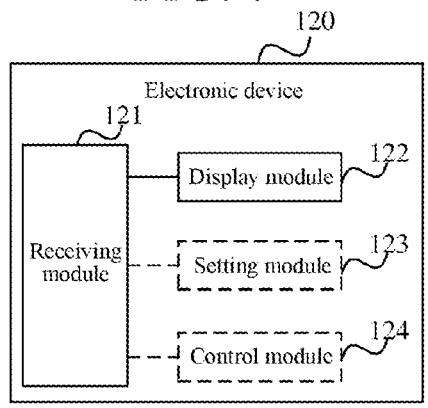
FIG. 8 is a schematic structural diagram of an electronic device according to an embodiment of the present disclosure.

As shown in FIG. 8, an embodiment of the present disclosure provides an electronic device 120. The electronic device 120 includes a receiving module 121 and a display module 122. The receiving module 121 is configured to receive a first input by a user in a case that a first interface of a first application is displayed, the first interface being an interface corresponding to a first group. The display module 122 is configured to display a second interface in response to the first input received by the receiving module 121, the second interface including a target list, the target list including at least one of the following: a member list of at least one group in the first application or a contact list in at least one address book in the first application. The receiving module 121 is further configured to receive a second input by the user for N members in the target list, N being an integer greater than 1. The display module 122 is further configured to display a third interface in response to the second input received by the receiving module 121, the third interface being an interface corresponding to a shared group, the shared group including at least two members of the N members, where in a case that the target list is a member list of the first group, the third interface is a group chat interface.

For example, the display module 122 is further configured to display a fourth interface in response to the first input received by the receiving module 121, the fourth interface including M group options and address book options in the first application, each group option being used for indicating a member list of one group, the address book option being used for indicating the contact list in the address book, M being a positive integer; receive a third input by the user, the third input being an input by the user for selecting a target option from the M group options and the address book options, the target option being used for indicating the target list; and display the second interface in response to the third input.

For example, the display module 122 is further configured to display first prompt information in response to the second input after the receiving module 121 receives the second input by the user, the first prompt information being used for prompting that a first member in the N members has refused to join the shared group and whether to reinvite the first member to join the shared group.

For example, the display module 122 is further configured to: display second prompt information in the second interface in a superimposed manner in response to the second input received by the receiving module 121, the second prompt information being used for prompting that a quantity of members who have joined the shared group is Q and whether to enter the interface corresponding to the shared group, Q being an integer greater than 2; receive a fourth input by the user for the second prompt information; and display the third interface in response to the fourth input.

For example, the display module 122 is further configured to display third prompt information in the third interface after displaying the third interface, the third prompt information being used for prompting that a second member in the shared group has left the shared group; or the third prompt information being used for prompting that a first object has joined the shared group.

For example, in a case that the third prompt information is used for prompting that the first object has joined the shared group, the display module 122 is further configured to display fourth prompt information in the third interface in a superimposed manner before displaying the third prompt information in the third interface, the fourth prompt information being used for prompting the user whether to allow the first object to join the shared group, the first object being an object invited by a member other than the user in the shared group to join the shared group. The receiving module 121 is further configured to receive a fifth input by the user for the fourth prompt information. The display module 122 is further configured to display the third prompt information in the third interface in response to the fifth input received by the receiving module 121.

For example, in a case that the third prompt information is used for prompting that the second member in the shared group has left the shared group, the display module 122 is further configured to display fifth prompt information in the third interface in a superimposed manner in a case that it is detected that a quantity of members in the shared group is less than or equal to a preset threshold after displaying the third prompt information in the third interface, the fifth prompt information being used for prompting whether to cancel the shared group.

For example, the electronic device 120 further includes a setting module 123. The receiving module 121 is further configured to receive a sixth input by the user after the display module 122 displays the third interface. The setting module 123 is configured to set a sharing permission for a third member in response to the sixth input received by the receiving module 121, the third member being a member other than the user in the shared group.

For example, after the third interface is displayed, and in a case that the third member has joined the shared group, the sharing permission includes: a permission to view chat information before the third member has joined the shared group.

For example, the electronic device 120 further includes a control module 124. In a case that the third interface is a group call interface, the receiving module 121 is further configured to receive a seventh input by the user after the display module 122 displays the third interface. The control module 124 is configured to control an electronic device of a fourth member in the shared group in response to the seventh input to adjust an output volume received by the receiving module 121.

For example, in a case that the third interface is a group chat interface, the receiving module 121 is further configured to receive an eighth input by the user within a preset time period in a case that the shared group has been canceled. The display module 122 is further configured to display historical chat information of the shared group in response to the eighth input received by the receiving module 121.

It should be noted that as shown in FIG. 8, the modules such as the receiving module 121 and the display module 122 that must be included in the electronic device 120 are indicated by solid boxes. Modules such as the setting module 123 and the control module 124 that can be or can be not included in the electronic device 120 are indicated by dashed boxes.

The electronic device provided in the embodiments of the present disclosure can implement various processes shown in any one of FIG. 2 to FIG. 7 in the foregoing method embodiments. To avoid repetition, details are not described herein again.

An embodiment of the present disclosure provides an electronic device, configured to: receive a first input by a user in a case that a first interface of a first application is displayed, the first interface being an interface corresponding to a first group; display a second interface in response to the first input, the second interface including a target list, the target list including at least one of the following: a member list of at least one group in the first application or a contact list in at least one address book in the first application; receive a second input by the user for N members in the target list, N being an integer greater than 1; and display a third interface in response to the second input, the third interface being an interface corresponding to a shared group, the shared group including at least two members of the N members, where in a case that the target list is a member list of the first group, the third interface is a group chat interface. By using this solution, in a case that a first interface of a first group is displayed, a user may rapidly establish a shared group between the user and at least two members in a target list by using a first input and a second input. In this way, in a case that the user needs to send a message to some members in a group (the user does not need to have a friend relationship with every member of the some members), the user may trigger an electronic device to rapidly establish the shared group between the user and the some members by using the first input and the second input, so that operations are simple and convenient, and time is saved for the user.

Figure 9:
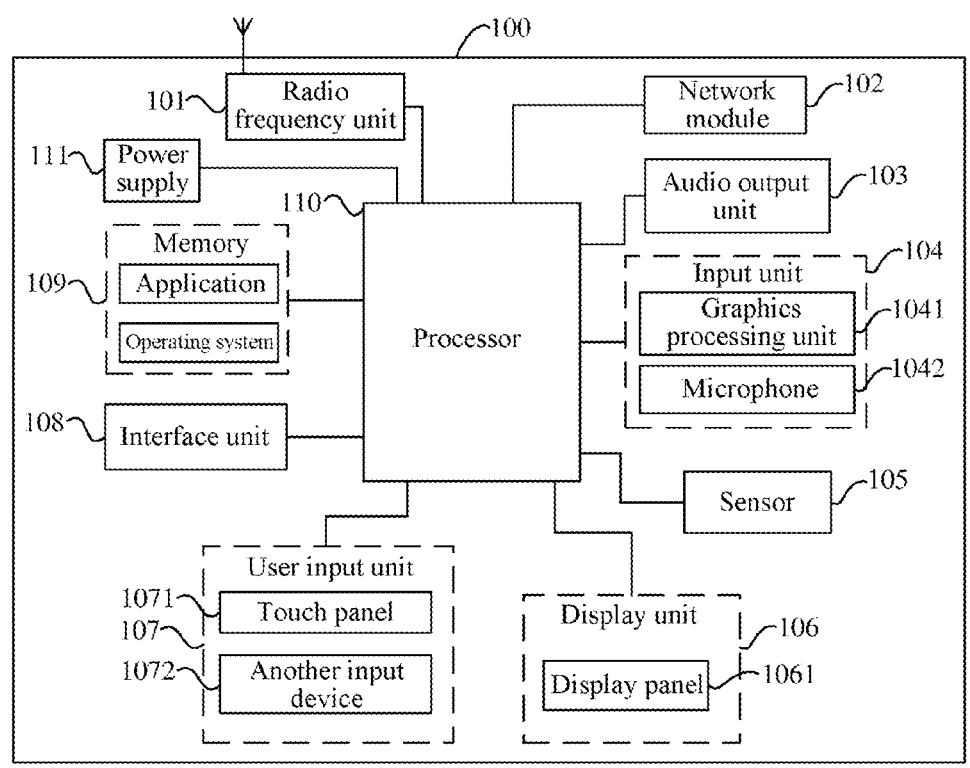
FIG. 9 is a schematic diagram of hardware of an electronic device according to an embodiment of the present disclosure.

FIG. 9 is a schematic diagram of hardware of an electronic device for implementing various embodiments of the present disclosure. As shown in FIG. 9, the electronic device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device shown in FIG. 9 constitutes no limitation on the electronic device, and the electronic device may include more or fewer components than those shown in the figure, or some components may be combined, or a different component deployment may be used. In this embodiment of the present disclosure, the electronic device includes, but is not limited to, a mobile phone, a tablet computer, a notebook computer, a palmtop computer, an in-vehicle electronic device, a wearable device, and a pedometer.

The user input unit 107 is configured to receive a first input by a user in a case that a first interface of a first application is displayed, the first interface being an interface corresponding to a first group. The display unit 106 is configured to display a second interface in response to the first input, the second interface including a target list, the target list including at least one of the following: a member list of at least one group in the first application or a contact list in at least one address book in the first application. The user input unit 107 is further configured to receive a second input by the user for N members in the target list, N being an integer greater than 1. The display unit 106 is further configured to display a third interface in response to the second input, the third interface being an interface corresponding to a shared group, the shared group including at least two members of the N members, where in a case that the target list is a member list of the first group, the third interface is a group chat interface.

An embodiment of the present disclosure provides an electronic device, configured to receive a first input by a user in a case that a first interface of a first application is displayed, the first interface being an interface corresponding to a first group; display a second interface in response to the first input, the second interface including a target list, the target list including at least one of the following: a member list of at least one group in the first application or a contact list in at least one address book in the first application; receive a second input by the user for N members in the target list, N being an integer greater than 1; and display a third interface in response to the second input, the third interface being an interface corresponding to a shared group, the shared group including at least two members of the N members, where in a case that the target list is a member list of the first group, the third interface is a group chat interface. By using this solution, in a case that a first interface of a first group is displayed, a user may rapidly establish a shared group between the user and at least two members in a target list by using a first input and a second input. In this way, in a case that the user needs to send a message to some members in a group (the user does not need to have a friend relationship with every member of the some members), the user may trigger an electronic device to rapidly establish the shared group between the user and the some members by using the first input and the second input, so that operations are simple and convenient, and time is saved for the user.

It should be understood that in this embodiment of the present disclosure, the radio frequency unit 101 may be configured to receive and transmit information or receive and transmit a signal during a call. Specifically, the radio frequency unit may receive downlink data from a base station for processing by the processor 110, In addition, UL data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with a network device and another device through a wireless communication system.

The electronic device provides the user with wireless broadband Internet access in the network module 102, such as helping the user to send and receive emails, browse web pages, and access streaming media.

The audio output unit 103 may convert audio data received by the radio frequency unit 101 or the network module 102 or stored in the memory 109 into an audio signal and output the audio signal as a sound. Moreover, the audio output unit 103 may further provide an audio output (such as call signal receiving sound or message receiving sound) related to a specific function executed by the electronic device 100. The audio output unit 103 includes a loudspeaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 performs processing on image data of a static picture or a video that is obtained by an image capture device (for example, a camera) in a video capture mode or an image capture mode. An image frame that has been processed may be displayed on the display unit 106. An image frame that has been processed by the graphics processing unit 1041 may be stored in the memory 109 (or another storage medium) or sent by using the radio frequency unit 101 or the network module 102. The microphone 1042 may receive a sound and can process the sound into audio data. The processed audio data may be converted, in a phone talk mode, into a format that may be sent to a mobile communication base station via the radio frequency unit 101 and be output.

The electronic device 100 further includes at least one sensor 105, such as an optical sensor, a motion sensor, and other sensors. Specifically, the optical sensor includes an ambient light sensor and a proximity sensor, where the ambient light sensor may adjust luminance of a display panel 1061 according to luminance of ambient light, and the proximity sensor may switch off the display panel 1061 and/or backlight when the electronic device 100 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock). The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided to a user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate key signal input related to the user setting and function control of the electronic device. Specifically, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a touch pen). The touch panel 1071 may include two parts: a touch detection apparatus and a touch controller. The touch detection apparatus detects a touch orientation of the user, detects a signal brought by the touch operation, and transmits the signal to the touch controller. The touch controller receives the touch information from the touch detection apparatus, converts the touch information into touch point coordinates, and transmits the touch point coordinates to the processor 110. Moreover, the touch controller may receive and execute a command transmitted from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Specifically, the another input device 1072 may include, but not limited to, a physical keyboard, a functional key (for example, a volume control key or a switch key), a track ball, a mouse, and a joystick. Details are not described herein again.

Further, the touch panel 1071 may cover the display panel 1061. After detecting a touch operation on or near the touch panel, the touch panel 1071 transfers the touch operation to the processor 110, to determine a type of a touch event. Then, the processor 110 provides a corresponding visual output on the display panel 1061 according to the type of the touch event. In FIG. 9, the touch panel 1071 and the display panel 1061 implement, as two independent parts, input and output functions of the electronic device. However, in some embodiments, the touch panel 1071 and the display panel 1061 may be integrated to implement the input and output functions of the electronic device, which is not specifically limited herein.

The interface unit 108 is an interface for connecting an external apparatus to the electronic device 100. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 108 may be configured to receive an input (for example, data information or power) from the external apparatus, and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory device or other non-volatile solid state storage devices.

A processor 110 is the control center of the electronic device, and is connected to various parts of the electronic device by using various interfaces and lines. By running or executing the software program and/or module stored in the memory 109, and invoking data stored in the memory 109, the processor performs various functions and data processing of the electronic device, thereby performing overall monitoring on the electronic device. The processor 110 may include one or more processing units. For example, the processor 110 may integrate an application processor and a modem processor. The application processor mainly processes an operating system, a user interface, an application program, and the like. The modem processor mainly processes wireless communication. It may be understood that the foregoing modem may either not be integrated into the processor 110.

The electronic device 100 may further include the power supply 111 (such as a battery) for supplying power to the components. For example, the power supply 111 may be logically connected to the processor 110 by using a power management system, thereby implementing functions, such as charging, discharging, and power consumption management, by using the power management system.

In addition, the electronic device 100 includes some unshown functional modules, which is not repeated herein.

An embodiment of the present disclosure further provides an electronic device, including the processor 110, the memory 109, and a computer program stored on the memory 109 and runnable on the processor 110 shown in FIG. 9, where when executed by the processor 110, the computer program implements the processes of the interface display method shown in any one of FIG. 2 to FIG. 7 in the foregoing method embodiments, and can achieve the same technical effects. To avoid repetition, details are not described herein again.

An embodiment of the present disclosure further provides a computer-readable storage medium, storing a computer program, where when executed by a processor, the computer program implements the processes of the interface display method shown in any one of FIG. 2 to FIG. 7 in the foregoing method embodiments, and can achieve the same technical effects. To avoid repetition, details are not described herein again. The computer-readable storage medium may include a flash drive, a read-only memory (ROM), a random access memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations, and the foregoing specific implementations are merely exemplary, but not limited. A plurality of forms may be further made by a person of ordinary skill in the art in enlightenment of the present disclosure without depart from the purpose of the present disclosure and the protection scope of the claims and all fall within the protection scope of the present disclosure.

What is claimed is:

1. An interface display method, comprising:
receiving a first input by a user when a first interface of a first application is displayed on a screen, the first interface being a group chat interface corresponding to a first group, the user being a member of the first group;

displaying a second interface on the screen in response to the first input, the second interface comprising a target list, the target list comprising a member list of at least one group in the first application and a contact list in at least one address book in the first application, wherein the at least one group comprises a group other than the first group;

receiving a second input by the user for N members in the target list, N being an integer greater than 1; and displaying a third interface on the screen in response to the second input, the third interface being an interface corresponding to a shared group, and the shared group comprising the user and at least two members of the N members, wherein the at least two members of the N members comprise at least one member from a second group, and at least one member is not in a direct friend relationship with the user such that the user cannot separately communicate with the at least one member.

2. The interface display method according to claim 1, wherein the displaying a second interface on the screen in response to the first input comprises:
displaying a fourth interface in response to the first input, the fourth interface comprising M group options and address book options in the first application, each group option being used for indicating a member list of one group, the address book option being used for indicating the contact list in the address book, M being a positive integer;

receiving a third input by the user, the third input being an input by the user for selecting a target option from the M group options and the address book options, the target option being used for indicating the target list; and displaying the second interface in response to the third input.

3. The interface display method according to claim 1, wherein after the receiving a second input by the user for N members in the target list, the method further comprises:
displaying first prompt information in response to the second input, the first prompt information being used for prompting that a first member in the N members has refused to join the shared group and whether to reinvite the first member to join the shared group.

4. The interface display method according to claim 1, wherein the displaying a third interface on the screen in response to the second input comprises:
displaying second prompt information in the second interface in a superimposed manner in response to the second input, the second prompt information being used for prompting that a quantity of members who have joined the shared group is Q and whether to enter the interface corresponding to the shared group, Q being an integer greater than 2;

receiving a fourth input by the user for the second prompt information; and displaying the third interface in response to the fourth input.

5. The interface display method according to claim 1, wherein after the displaying a third interface, the method further comprises:
displaying third prompt information in the third interface, the third prompt information being used for prompting that a second member in the shared group has left the shared group, or the third prompt information being used for prompting that a first object has joined the shared group.

6. The interface display method according to claim 5, wherein when the third prompt information is used for prompting that the first object has joined the shared group, before the displaying third prompt information in the third interface, the method further comprises:
   displaying fourth prompt information in the third interface in a superimposed manner, the fourth prompt information being used for prompting the user whether to allow the first object to join the shared group, the first object being an object invited by a member other than the user in the shared group to join the shared group; and
   wherein the displaying third prompt information in the third interface comprises:
   receiving a fifth input by the user for the fourth prompt information; and
   displaying the third prompt information in the third interface in response to the fifth input.

7. The method according to claim 5, wherein when the third prompt information is used for prompting that the second member in the shared group has left the shared group, after the displaying third prompt information in the third interface, the method further comprises:
   displaying fifth prompt information in the third interface in a superimposed manner when it is detected that a quantity of members in the shared group is less than or equal to a preset threshold, the fifth prompt information being used for prompting whether to cancel the shared group.

8. The method according claim 7, wherein after the displaying a third interface, the method further comprises:
   receiving a sixth input by the user; and
   setting a sharing permission for a third member in response to the sixth input, the third member being a member other than the user in the shared group.

9. The method according to claim 8, wherein when the third interface is a group chat interface, the method further comprises:
   receiving an eighth input by the user within a preset time period when the shared group has been canceled; and
   displaying historical chat information of the shared group in response to the eighth input.

10. An electronic device, comprising: a memory storing a computer program; and a processor coupled to the memory and configured to execute the computer program to perform an interface display method, the method comprising:
    receiving a first input by a user when a first interface of a first application is displayed on a screen, the first interface being a group chat interface corresponding to a first group, the user being a member of the first group;
    displaying a second interface on the screen in response to the first input, the second interface comprising a target list, the target list comprising a member list of at least one group in the first application and a contact list in at least one address book in the first application, wherein the at least one group comprises a group other than the first group;
    receiving a second input by the user for N members in the target list, N being an integer greater than 1; and
    displaying a third interface on the screen in response to the second input, the third interface being an interface corresponding to a shared group, and the shared group comprising the user and at least two members of the N members,
    wherein the at least two members of the N members comprise at least one member from a second group, and at least one member is not in a direct friend relationship with the user such that the user cannot separately communicate with the at least one member.

11. The electronic device according to claim 10, wherein the displaying a second interface on the screen in response to the first input comprises:
    displaying a fourth interface in response to the first input, the fourth interface comprising M group options and address book options in the first application, each group option being used for indicating a member list of one group, the address book option being used for indicating the contact list in the address book, M being a positive integer;
    receiving a third input by the user, the third input being an input by the user for selecting a target option from the M group options and the address book options, the target option being used for indicating the target list; and
    displaying the second interface in response to the third input.

12. The electronic device according to claim 10, wherein after the receiving a second input by the user for N members in the target list, the method further comprises:
    displaying first prompt information in response to the second input, the first prompt information being used for prompting that a first member in the N members has refused to join the shared group and whether to reinvite the first member to join the shared group.

13. The electronic device according to claim 10, wherein the displaying a third interface in response to the second input comprises:
    displaying second prompt information in the second interface in a superimposed manner in response to the second input, the second prompt information being used for prompting that a quantity of members who have joined the shared group is Q and whether to enter the interface corresponding to the shared group, Q being an integer greater than 2;
    receiving a fourth input by the user for the second prompt information; and
    displaying the third interface in response to the fourth input.

14. The electronic device according to claim 10, wherein after the displaying a third interface, the method further comprises:
    displaying third prompt information in the third interface, the third prompt information being used for prompting that a second member in the shared group has left the shared group, or the third prompt information being used for prompting that a first object has joined the shared group.

15. The electronic device according to claim 14, wherein when the third prompt information is used for prompting that the first object has joined the shared group, before the displaying third prompt information in the third interface, the method further comprises:
    displaying fourth prompt information in the third interface in a superimposed manner, the fourth prompt information being used for prompting the user whether to allow the first object to join the shared group, the first object being an object invited by a member other than the user in the shared group to join the shared group; and
    wherein the displaying third prompt information in the third interface comprises:

receiving a fifth input by the user for the fourth prompt information; and displaying the third prompt information in the third interface in response to the fifth input.

16. The electronic device according to claim 14, wherein when the third prompt information is used for prompting that the second member in the shared group has left the shared group, after the displaying third prompt information in the third interface, the method further comprises:

displaying fifth prompt information in the third interface in a superimposed manner when it is detected that a quantity of members in the shared group is less than or equal to a preset threshold, the fifth prompt information being used for prompting whether to cancel the shared group.

17. The electronic device according to claim 16, wherein after the displaying a third interface, the method further comprises:

receiving a sixth input by the user; and setting a sharing permission for a third member in response to the sixth input, the third member being a member other than the user in the shared group.

18. The electronic device according to claim 17, wherein when the third interface is a group chat interface, the method further comprises:

receiving an eighth input by the user within a preset time period when the shared group has been canceled; and displaying historical chat information of the shared group in response to the eighth input.

19. A non-transitory computer-readable storage medium, storing a computer program, when the computer program is executed by a processor, implements an interface display method, the method comprising:

receiving a first input by a user when a first interface of a first application is displayed on a screen, the first interface being a group chat interface corresponding to a first group, the user being a member of the first group;

displaying a second interface on the screen in response to the first input, the second interface comprising a target list, the target list comprising a member list of at least one group in the first application and a contact list in at least one address book in the first application, wherein the at least one group comprises a group other than the first group;

receiving a second input by the user for N members in the target list, N being an integer greater than 1; and displaying a third interface on the screen in response to the second input, the third interface being an interface corresponding to a shared group, and the shared group comprising the user and at least two members of the N members, wherein the at least two members of the N members comprise at least one member from a second group, and at least one member that is not in a direct friend relationship with the user such that the user cannot separately communicate with the at least one member.

20. The non-transitory computer-readable storage medium according to claim 19, wherein the displaying a second interface on the screen in response to the first input comprises:

displaying a fourth interface in response to the first input, the fourth interface comprising M group options and address book options in the first application, each group option being used for indicating a member list of one group, the address book option being used for indicating the contact list in the address book, M being a positive integer;

receiving a third input by the user, the third input being an input by the user for selecting a target option from the M group options and the address book options, the target option being used for indicating the target list; and displaying the second interface in response to the third input.

* * * * *